(12) United States Patent
Ito

(10) Patent No.: US 11,480,840 B2
(45) Date of Patent: Oct. 25, 2022

(54) ELECTRIC OPTICAL DEVICE, ELECTRONIC DEVICE, AND MANUFACTURING METHOD OF ELECTRIC OPTICAL DEVICE

(71) Applicant: SEIKO EPSON CORPORATION, Tokyo (JP)

(72) Inventor: Satoshi Ito, Higashihiroshima (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/369,383

(22) Filed: Jul. 7, 2021

(65) Prior Publication Data

US 2022/0011615 A1 Jan. 13, 2022

(30) Foreign Application Priority Data

Jul. 8, 2020 (JP) .............................. JP2020-117597

(51) Int. Cl.
| | | |
|---|---|---|
| *G02F 1/1343* | (2006.01) | |
| *G02F 1/1362* | (2006.01) | |
| *G02F 1/1333* | (2006.01) | |
| *G02F 1/1368* | (2006.01) | |

(52) U.S. Cl.
CPC .......... *G02F 1/1368* (2013.01); *G02F 1/1343* (2013.01); *G02F 1/133345* (2013.01); *G02F 1/136209* (2013.01); *G02F 1/136227* (2013.01)

(58) Field of Classification Search
CPC ............. G02F 1/1343; G02F 1/134309; G02F 1/134318; G02F 1/13439; G02F 1/1362; G02F 1/136209; G02F 1/136227; G02F 1/1368; G02F 1/13685; G02F 1/1333; G02F 1/133345; G02F 1/133512
See application file for complete search history.

(56) References Cited

U.S. PATENT DOCUMENTS

| | | |
|---|---|---|
| 2002/0063823 A1 | 5/2002 | Okuda et al. |
| 2012/0153275 A1* | 6/2012 | Endo ................. H01L 29/42384 257/43 |
| 2018/0239205 A1* | 8/2018 | Yokota .................. H01L 27/124 |
| 2019/0121209 A1* | 4/2019 | Izawa ..................... H01L 28/60 |

FOREIGN PATENT DOCUMENTS

| | | |
|---|---|---|
| JP | 2000-171827 A | 6/2000 |
| JP | 2000-352725 A | 12/2000 |
| JP | 2005-062759 A | 3/2005 |
| JP | 2006-064967 A | 3/2006 |

* cited by examiner

*Primary Examiner* — Thoi V Duong
(74) *Attorney, Agent, or Firm* — Oliff PLC

(57) ABSTRACT

A liquid crystal device includes, on a first base material, pixels and a capacitive element disposed in a light shielding region between the pixels, and the capacitive element includes a first capacitive wiring disposed along the light shielding region, a dielectric layer that covers at least consecutive three surfaces (a surface O, a surface P and a surface Q) of the first capacitive wiring, and a second capacitive wiring that faces at least the consecutive three surfaces of the first capacitive wiring through the dielectric layer.

9 Claims, 13 Drawing Sheets

ELECTRIC OPTICAL DEVICE, ELECTRONIC DEVICE, AND MANUFACTURING METHOD OF ELECTRIC OPTICAL DEVICE

The present application is based on, and claims priority from JP Application Serial Number 2020-117597, filed Jul. 8, 2020, the disclosure of which is hereby incorporated by reference herein in its entirety.

BACKGROUND

1. Technical Field

The present disclosure relates to an electric optical device, an electronic device, and a manufacturing method of an electric optical device.

2. Related Art

As an electric optical device, an active drive type liquid crystal device including a pixel switching element is known. Such a liquid crystal device is used as a light valve of a projector serving as an electronic device, for example.

A liquid crystal device is provided with a capacitive element having a structure in which a dielectric film is sandwiched between a pair of capacitive wirings for the purpose of maintaining the pixel potential. The capacitive element is disposed in a light shielding region between pixels adjacent to each other in plan view. For example, JP-A-2006-64967 discloses a technique in which a capacitive element is disposed in a trench in order to increase the electrical capacity while narrowing the light shielding region.

The technique disclosed in JP-A-2006-64967, however, disadvantageously generates coverage defects of the film formed in the trench. As such, it is difficult to achieve narrow pitch of the pixels, i.e., it is difficult to achieve miniaturization.

SUMMARY

An electric optical device includes, at a substrate, a pixel and a capacitive element disposed in a light shielding region between the pixel and another pixel adjacent to the pixel, and the capacitive element includes a first capacitive electrode disposed along the light shielding region; a capacitive insulation layer configured to cover at least consecutive three surfaces of the first capacitive electrode; and a second capacitive electrode configured to face the three surfaces of the first capacitive electrode through the capacitive insulation layer.

An electronic device includes the above-described electric optical device.

A manufacturing method of an electric optical device includes forming a first wiring at a substrate; sequentially forming an interlayer insulation layer, a stopper layer and a sacrificial layer on the substrate and the first wiring; forming a recess in the sacrificial layer, the stopper layer, and the interlayer insulation layer such that the recess reaches the first wiring; forming a spacer at a side wall of the recess; forming a first capacitive electrode having a plug shape in the recess including the spacer; exposing a part of the first capacitive electrode by removing a part of the spacer and the sacrificial layer by using the stopper layer; sequentially forming a capacitive insulation layer and a second capacitive electrode in such a manner as to cover at least consecutive three surfaces of the first capacitive electrode that are exposed; and forming a capacitive element by removing the second capacitive electrode, the capacitive insulation layer, and the stopper layer so that the capacitive element has the same width as a width of the first wiring.

DESCRIPTION OF EXEMPLARY EMBODIMENTS

Figure 1:
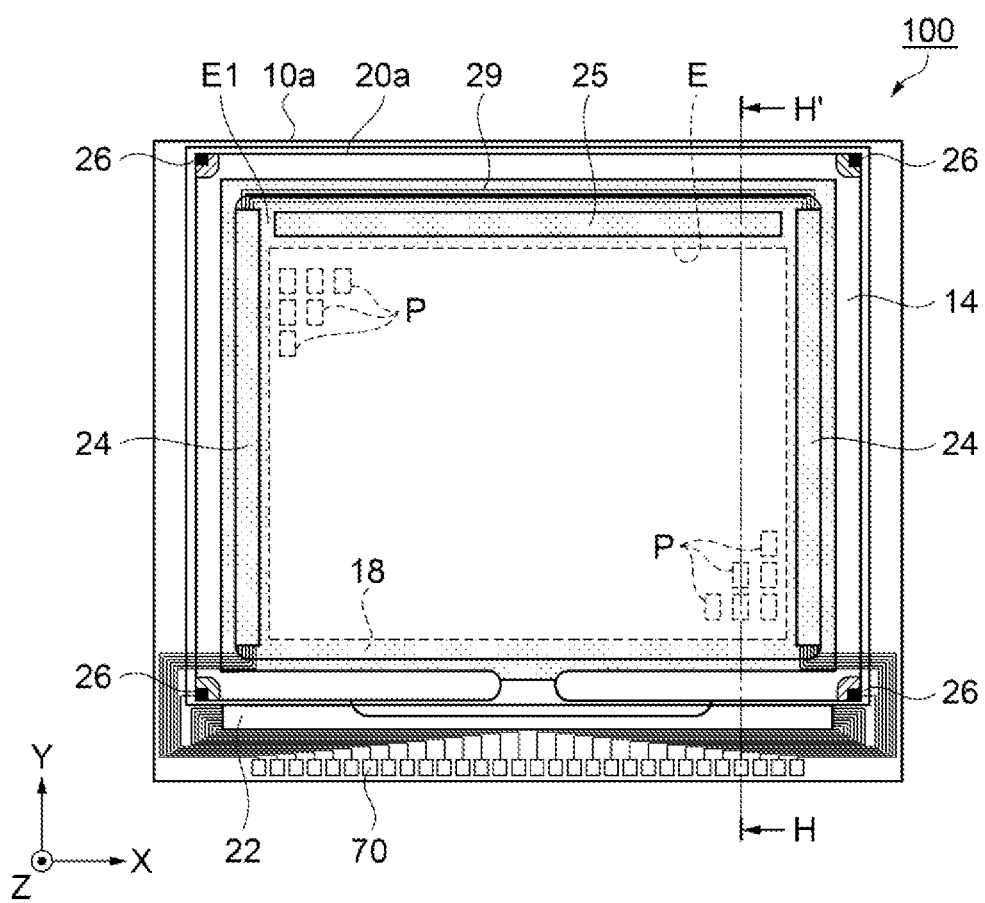
FIG. 1 is a plan view illustrating a configuration of a liquid crystal device of a present embodiment.
Figure 2:
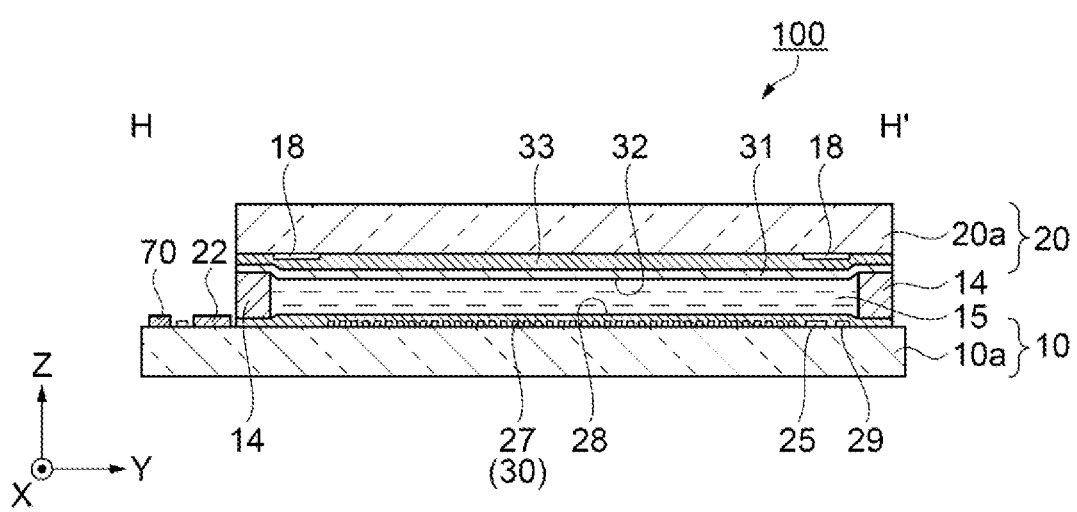
FIG. 2 is a sectional view taken along a line H-H' of the liquid crystal device illustrated in FIG. 1.

As illustrated in FIG. 1 and FIG. 2, a liquid crystal device 100 serving as an electric optical device according to the present embodiment includes an element substrate 10 and an opposed substrate 20 disposed opposite to each other, and a liquid crystal layer 15 sandwiched between the pair of substrates. A first base material 10a serving as a substrate that constitutes the element substrate 10 and a second base material 20a that constitutes the opposed substrate 20 are glass or quartz, for example.

The element substrate 10 is larger than the opposed substrate 20, and the both substrates are joined to each other through a sealing material 14 disposed along the outer periphery of the opposed substrate 20. Liquid crystals with positive or negative dielectric anisotropy are sealed in the gap therebetween to form the liquid crystal layer 15.

An adhesive agent such as thermosetting or ultraviolet curing epoxy resin is employed as the sealing material 14, for example. A spacer for maintaining a certain distance between the pair of substrates is mixed in the sealing material 14, for example.

A display region E that includes a plurality of pixels P arranged therein and contributes to the display is provided inside the sealing material 14. A peripheral region E1 that includes a peripheral circuit and the like and does not contribute to the display is disposed around the display region E.

Along one side of the element substrate 10, a data line driving circuit 22 is provided between the sealing material 14 and the one side. In addition, along the other side opposite to the one side, an inspection circuit 25 is provided between the sealing material 14 and the display region E. Further, along the other two sides opposite to each other and orthogonal to the one side, a scan line driving circuit 24 is provided between the sealing material 14 and the display region E. Along the other side opposite to the one side, a plurality of wirings 29 that couples the two scan line driving circuits 24 is provided between the sealing material 14 and the inspection circuit 25.

Inside the sealing material 14 disposed in a frame shape on the opposed substrate 20 side, a light shielding film 18 is provided in a frame shape in the same manner. For example, the light shielding film 18 is composed of metal, metal oxide, and the like having a light reflecting property, and the display region E provided with the plurality of pixels P is disposed inside the light shielding film 18. Tungsten silicide (WSi) may be used as the light shielding film 18, for example.

The wiring coupled to the data line driving circuit 22 and the scan line driving circuit 24 are coupled to a plurality of external coupling terminals 70 arranged along the one side. In the following description, the direction along the one side is the X direction, and the direction along the other two sides opposite to each other and orthogonal to the one side is the Y direction. In addition, a view as viewed in the Z direction is a plan view.

As illustrated in FIG. 2, an optically transparent pixel electrode 27 provided for each pixel P, a thin film transistor serving as a switching element (hereinafter referred to as a "transistor 30"), a data line (not illustrated), and a first orientation film 28 that covers them are formed on the surface of the first base material 10a on the liquid crystal layer 15 side.

The pixel electrode 27 is formed of a transparent conducting film of indium tin oxide (ITO), for example. The element substrate 10 of the present disclosure includes at least the pixel electrode 27, the transistor 30, and the first orientation film 28.

On the surface of the opposed substrate 20 on the liquid crystal layer 15 side, the light shielding film 18, an insulation layer 33 formed to cover it, an opposite electrode 31 provided to cover insulation layer 33, and a second orientation film 32 that covers the opposite electrode 31 are provided. The opposed substrate 20 of the present disclosure includes at least the light shielding film 18, the opposite electrode 31, and the second orientation film 32.

The light shielding film 18 surrounds the display region E, and is provided at a position where it overlaps the scan line driving circuit 24 and the inspection circuit 25 in plan as illustrated in FIG. 1. This blocks the light that impinges on the peripheral circuit including the driving circuits from the opposed substrate 20 side, and achieves a role of preventing the peripheral circuit from malfunctioning due to the light. This also ensures a high contrast in the display of the display region E by shielding unnecessary stray light from entering the display region E.

The insulation layer 33 is composed of an inorganic material such as silicon oxide, and is provided to cover the light shielding film 18, with optical transparency, for example. Examples of a formation method of such an insulation layer 33 include a plasma chemical vapor deposition (CVD) method.

The opposite electrode 31, which is composed of a transparent conducting film of ITO or the like for example, covers the insulation layer 33. As illustrated in FIG. 1, the opposite electrode 31 is electrically coupled with the wiring on the element substrate 10 side through vertical conduction parts 26 provided at the four corners of the opposed substrate 20.

The first orientation film 28 that covers the pixel electrode 27 and the second orientation film 32 that covers and the opposite electrode 31 are selected based on the optical design of the liquid crystal device 100. An example of the first orientation film 28 and the second orientation film 32 is an inorganic alignment film obtained by depositing an inorganic material such as SiOx (silicon oxide) by a vapor phase growth method such that it is substantially vertically oriented to liquid crystal molecules having negative dielectric anisotropy.

For example, such a liquid crystal device 100 is of a transmissive type, and employs an optical design of the normal white mode, in which the transmittance of the pixel P when no voltage is applied is greater than the transmittance when voltage is applied, or the normal black mode, in which the transmittance of the pixel P when no voltage is applied is smaller than the transmittance when voltage is applied. A polarization element may be disposed and used on each of the light incidence side and the light emission side in accordance with the optical design. It can also be applied to reflective liquid crystal devices.

Figure 3:
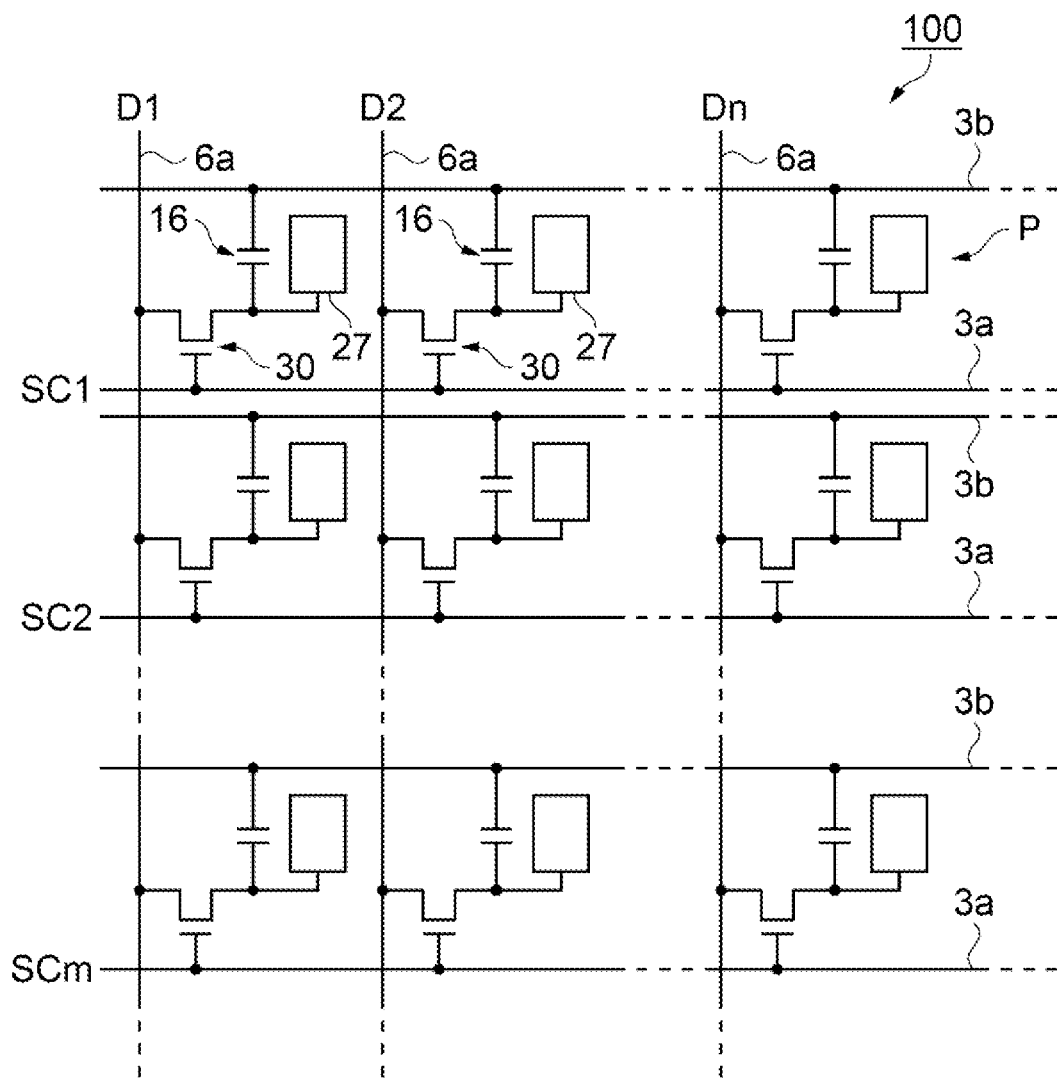
FIG. 3 is an equivalent circuit diagram illustrating an electrical configuration of the liquid crystal device.

As illustrated in FIG. 3, the liquid crystal device 100 includes a plurality of scan lines 3a, a plurality of data lines 6a, and capacitance lines 3b, which are insulated and orthogonal to each other in at least the display region E. For example, the direction in which the scan line 3a extends is the X direction, and the direction in which the data line 6a extends is the Y direction.

In regions sectioned by the scan line 3a, the data line 6a, the capacitance line 3b, and the signal lines thereof, the pixel electrode 27, the transistor 30, and a capacitive element 16 are provided, thus constituting a pixel circuit of the pixel P.

The scan line 3a is electrically coupled with the gate of the transistor 30, and the data line 6a is electrically coupled with the source region of the transistor 30. The pixel electrode 27 is electrically coupled with the drain region of the transistor 30.

The data line 6a is coupled with the data line driving circuit 22 (see FIG. 1), and supplies, to the pixel P, image signals D1, D2, . . . , and Dn supplied from the data line driving circuit 22. The scan line 3a is coupled with the scan line driving circuit 24 (see FIG. 1), and supplies, to each pixel P, scanning signals SC1, SC2, . . . , and SCm supplied from the scan line driving circuit 24.

The image signals D1 to Dn supplied from the data line driving circuit 22 to the data line 6a may be line-sequentially supplied in this order, or may be supplied for each group of a plurality of adjacent data lines 6a. The scan line driving circuit 24 line-sequentially supplies, to the scan line 3a, the scanning signals SC1 to SCm at a predetermined timing in a pulsed manner.

The liquid crystal device 100 has a configuration in which when the transistor 30 serving as a switching element is turned on for a certain period with the input of the scanning signals SC1 to SCm, the image signals D1 to Dn supplied from the data line 6a are written in the pixel electrode 27 at a predetermined timing. Then, the image signals D1 to Dn of a predetermined level that are written in the liquid crystal layer 15 through the pixel electrode 27 are held for a certain period between the pixel electrode 27 and the opposite electrode 31 disposed opposite to it through the liquid crystal layer 15.

For the purpose of preventing leakage of the held image signals D1 to Dn, the capacitive element 16 is coupled in parallel to the liquid crystal capacity formed between the pixel electrode 27 and the opposite electrode 31. The capacitive element 16 includes a dielectric layer serving as a capacitive insulation layer between two capacitive wirings.

Figure 4:
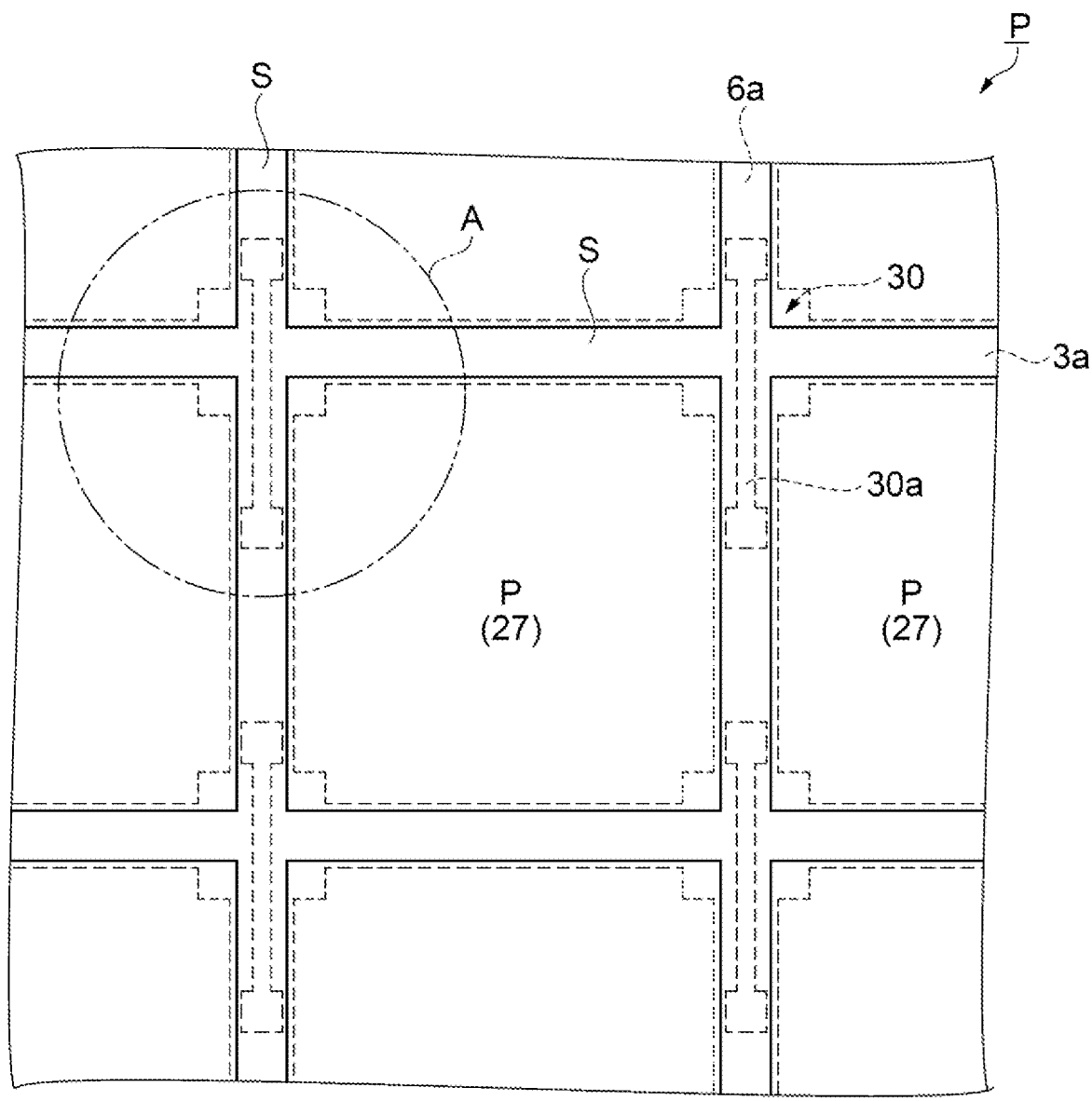
FIG. 4 is a plan view illustrating a configuration of a pixel.

As illustrated in FIG. 4, in the pixel P, the region between the pixel electrodes 27 adjacent to each other is a light shielding region S, and the data line 6a and the scan line 3a are disposed in the light shielding region S. In addition, the transistor 30 is disposed at a portion where the data line 6a and the scan line 3a intersect.

Figure 5:
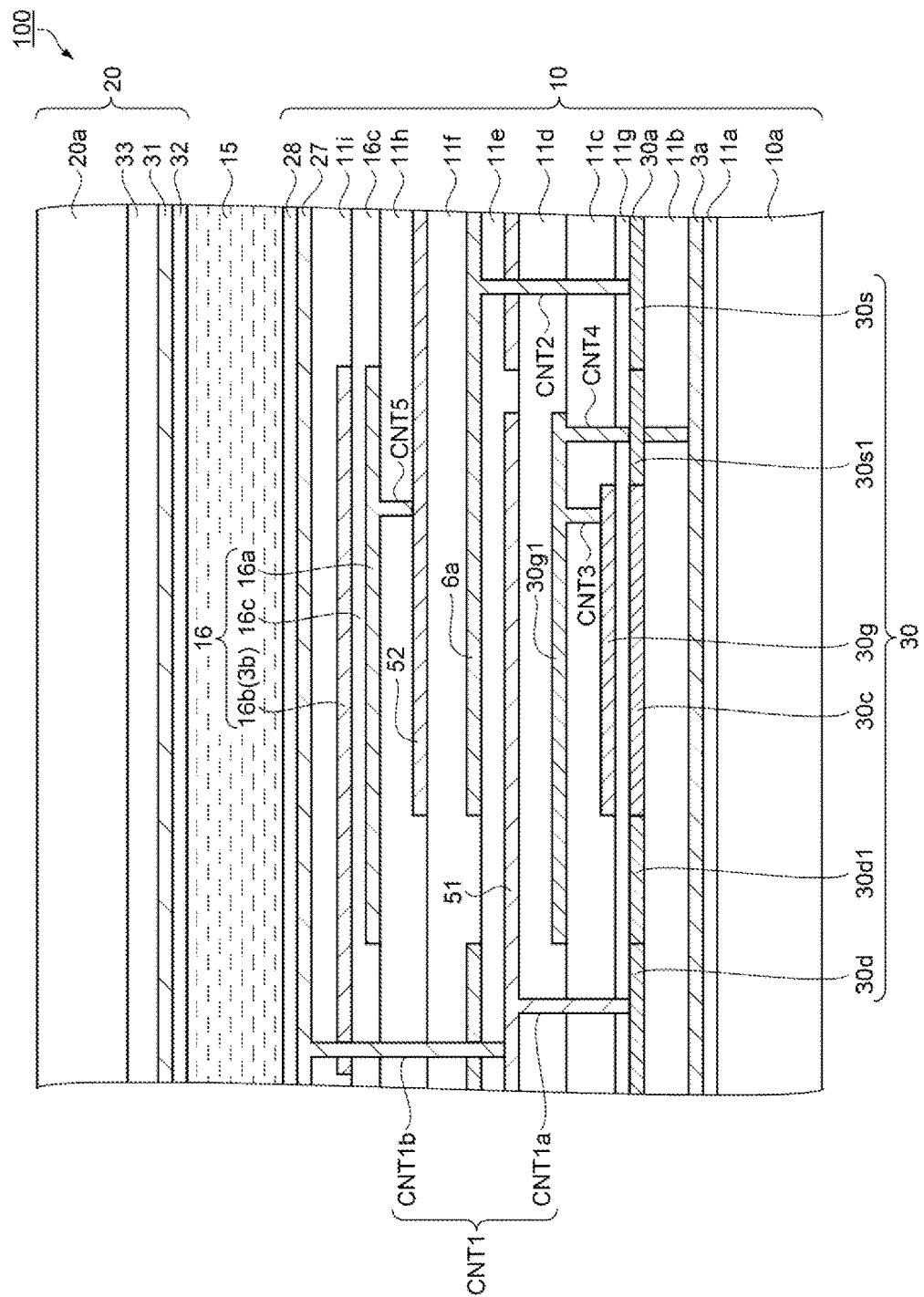
FIG. 5 is a sectional view illustrating a configuration of the liquid crystal device.

As illustrated in FIG. 5, the liquid crystal device 100 includes the element substrate 10 and the opposed substrate 20 disposed opposite to the element substrate 10. The first base material 10a that constitutes the element substrate 10 is quartz, for example. The element substrate 10 includes, on the first base material 10a, the scan line 3a, the transistor 30, the data line 6a, the capacitive element 16, the pixel electrode 27, and the first orientation film 28.

To be more specific, an insulation layer 11a composed of silicon oxide or the like is disposed on the first base material 10a. The scan line 3a that functions also as a light shielding film composed of tungsten silicide (WSi) or the like is disposed on the insulation layer 11a.

An insulation layer 11b composed of silicon oxide or the like is disposed on the scan line 3a and the insulation layer 11a. The transistor 30 is disposed on the insulation layer 11b.

For example, the transistor 30 has a lightly doped drain (LDD) structure, and includes a semiconductor layer 30a composed of polysilicon (high purity polycrystalline silicon) or the like, a gate insulation layer 11g formed on the semiconductor layer 30a, and a gate electrode 30g composed of aluminum or the like and formed on the gate insulation layer 11g.

For example, the semiconductor layer 30a is formed as the transistor 30 of N type by injecting N-type impurity ions such as phosphor (P) ions. To be more specific, the semiconductor layer 30a includes a channel region 30c, a first LDD region 30s1, a source region 30s, a second LDD region 30d1 serving as an LDD region, and a drain region 30d.

The channel region 30c is doped with P-type impurity ions such as such as boron (B) ions. Other regions (30s1, 30s, 30d1 and 30d) are doped with N-type impurity ions such as phosphor (P) ions.

An insulation layer 11c composed of silicon oxide or the like is disposed on the gate electrode 30g and the gate insulation layer 11g. A gate wiring 30g1 composed of aluminum or the like and electrically coupled with the gate electrode 30g through a contact hole CNT3 is disposed on the insulation layer 11c. The gate wiring 30g1 is electrically coupled with the scan line 3a through a contact hole CNT4.

An insulation layer 11d composed of silicon oxide or the like is disposed on the gate wiring 30g1 and the insulation layer 11c. A relaying wiring 51 composed of aluminum or the like and electrically coupled with the drain region 30d through a contact hole CNT1a is disposed on the insulation layer 11d. An insulation layer 11e composed of silicon oxide or the like is disposed on the relaying wiring 51 and the insulation layer 11d.

The data line 6a electrically coupled with the source region 30s through a contact hole CNT2 is disposed on the insulation layer 11e. An insulation layer 11f composed of silicon oxide or the like is disposed on the data line 6a and the insulation layer 11e. A common wiring 52 serving as a first wiring to which a common potential is applied is disposed on the insulation layer 11f. An insulation layer 11h serving as an interlayer insulation layer composed of silicon oxide or the like is disposed on the common wiring 52.

The capacitive element 16 is disposed on the insulation layer 11h. To be more specific, the capacitive element 16 includes, for example, a first capacitive wiring 16a that is a capacitive wiring on the fixed potential side, a second capacitive wiring 16b electrically coupled with the drain region 30d of the transistor 30, and a dielectric layer 16c disposed between the first capacitive wiring 16a and the second capacitive wiring 16b. The first capacitive wiring 16a is electrically coupled with the common wiring 52 through a contact hole CNT5. It is to be noted that the first capacitive wiring 16a is an aspect of a first capacitive electrode, and the second capacitive wiring 16b is an aspect of a second capacitive electrode.

An insulation layer 11i composed of silicon oxide or the like is disposed on the capacitive element 16. The pixel electrode 27 electrically coupled with the second capacitive wiring 16b through a contact hole CNT1 is formed on the insulation layer 11i. The pixel electrode 27 is a transparent conducting film of ITO or the like, for example.

The first orientation film 28, which is an obliquely deposited inorganic material such as silicon oxide, is disposed on the pixel electrode 27. The liquid crystal layer 15 in which the liquid crystal or the like is sealed in the space surrounded by the sealing material 14 is disposed on the first orientation film 28.

On the other hand, the opposed substrate 20 includes, on the second base material 20a (the liquid crystal layer 15 side), the insulation layer 33, the opposite electrode 31, and the second orientation film 32. The second base material 20a is quartz, for example. The insulation layer 33 is composed of silicon oxide, for example. The opposite electrode 31 is a transparent conducting film of ITO or the like, for example. The second orientation film 32 is formed by obliquely depositing an inorganic material such as silicon oxide.

The liquid crystal layer 15 is set in a predetermined orientational state with orientation films 28 and 32 in the state where no electric field is generated between the pixel electrode 27 and the opposite electrode 31. Next, configurations of the pixel P and the capacitive element 16 are described with reference to FIG. 6 and FIG. 7.

Figure 6:
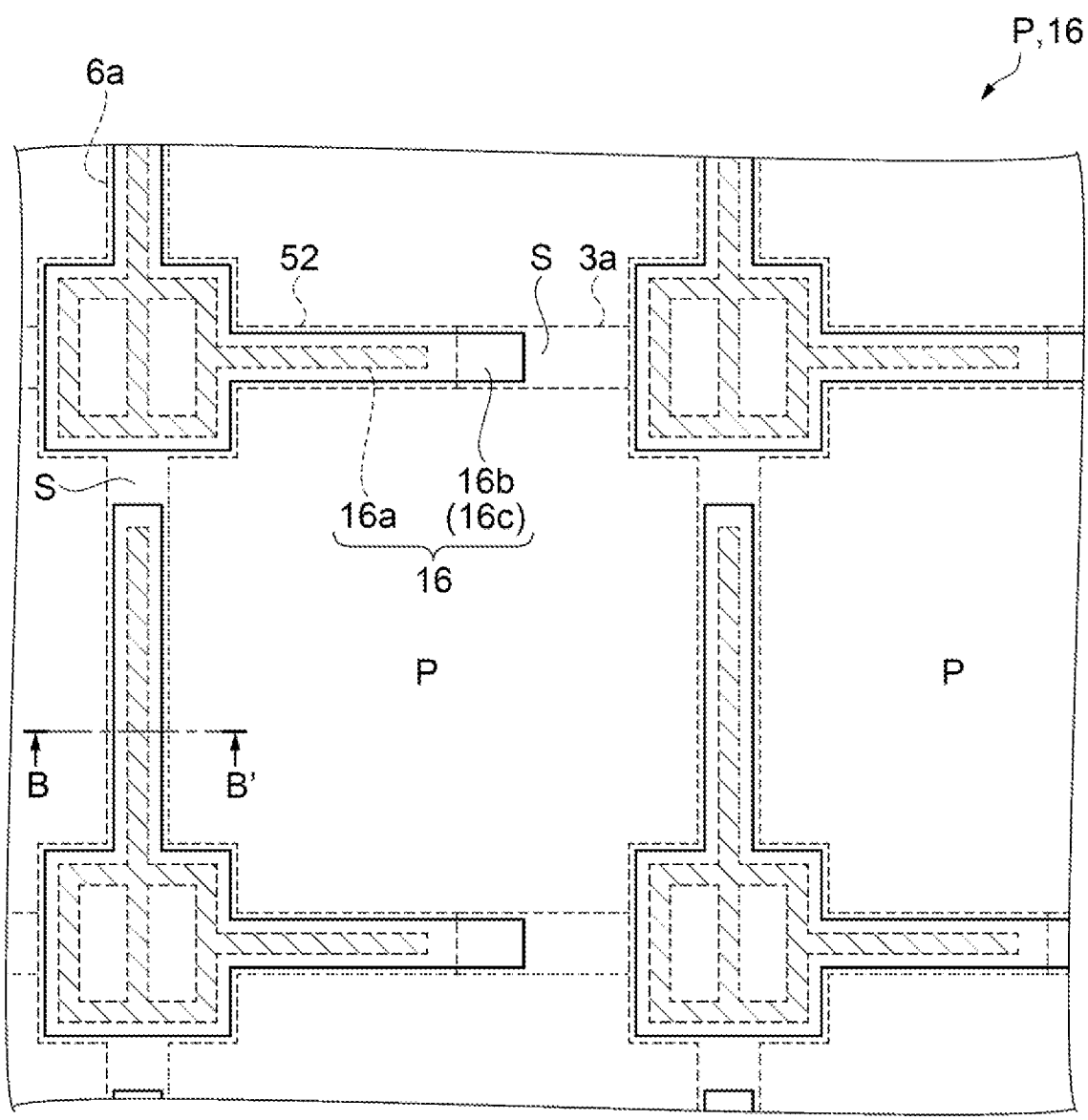
FIG. 6 is a plan view illustrating a configuration of a capacitive element.
Figure 7:
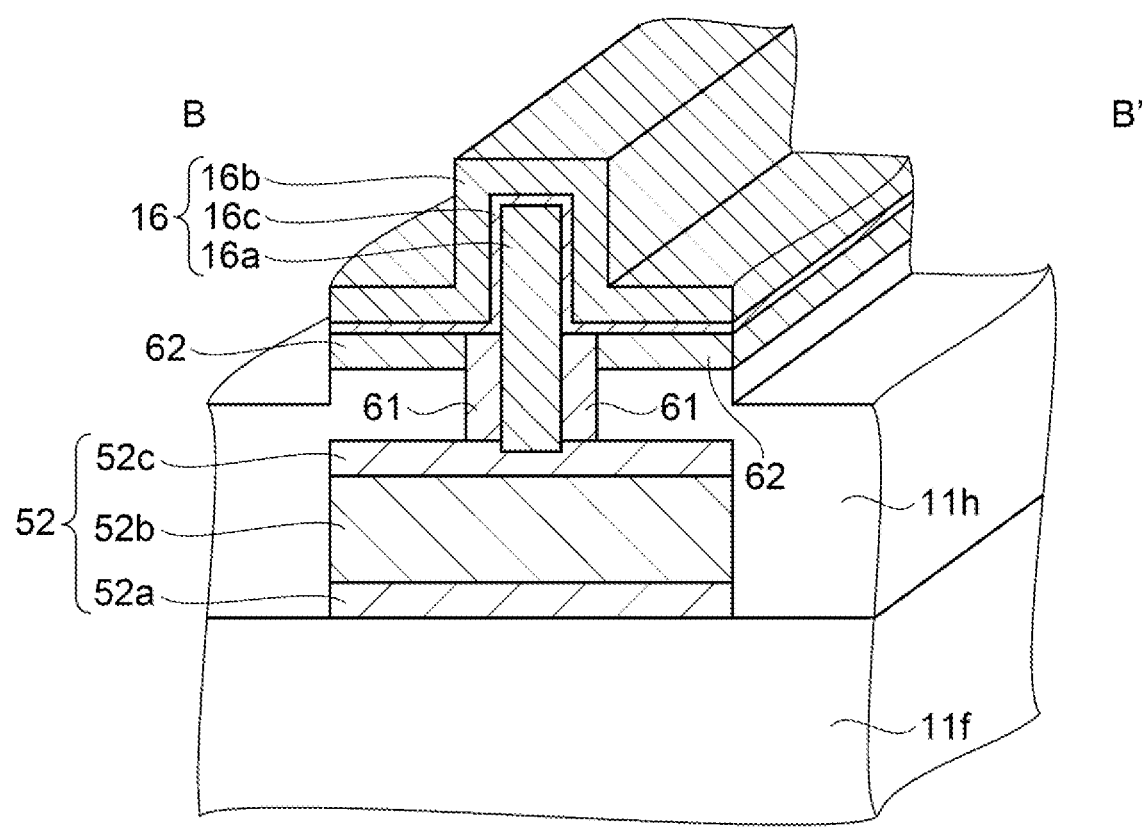
FIG. 7 is a partially enlarged perspective view of a capacitive element 16 in a cross-section taken along a line B-B' of the capacitive element illustrated in FIG. 6.

FIG. 6 is a plan view illustrating a configuration of the capacitive element 16 and its vicinity in the configuration of the pixel P of the element substrate 10. FIG. 7 is a partially enlarged perspective view of the capacitive element 16 in a cross-section taken along the line B-B' of the capacitive element illustrated in FIG. 6, and illustrates a structure from the insulation layer 11f to the capacitive element 16 in the light shielding region S.

As illustrated in FIG. 6, the capacitive element 16 is disposed at a position where it overlaps the data line 6a and the scan line 3a in plan view in the light shielding region S. It is to be noted that as described above, the capacitive element 16 includes the first capacitive wiring 16a, the second capacitive wiring 16b, and the dielectric layer 16c. As illustrated in FIG. 6, the first capacitive wiring 16a is disposed along the direction in which the light shielding region S extends.

To be more specific, as illustrated in FIG. 7, the first capacitive wiring 16a is disposed in contact with the common wiring 52 and is electrically coupled with the common wiring 52. The common wiring 52 is a laminated film of a tungsten silicide (W—Si) film 52a, a nitride titanium (TiN) film 52b, and an aluminum (Al) film 52c, for example. It is to be noted that the first capacitive wiring 16a may be configured not to be electrically coupled with the common wiring 52.

The first capacitive wiring 16a is disposed to extend through the insulation layer 11h and a stopper layer 62. In addition, the upper part of the first capacitive wiring 16a is disposed to protrude from the insulation layer 11h and the stopper layer 62. A spacer 61 for thinning the first capacitive wiring 16a is disposed between the first capacitive wiring 16a, and the insulation layer 11h and the stopper layer 62. The first capacitive wiring 16a is tungsten, for example. The spacer 61 is silicon oxide, for example. The stopper layer 62 is silicon nitride, for example.

The dielectric layer 16c and the second capacitive wiring 16b are formed on a protruding portion of the first capacitive wiring 16a, the spacer 61 and the stopper layer 62. To be more specific, the dielectric layer 16c and the second capacitive wiring 16b are formed to cover at least the three consecutive surfaces of the first capacitive wiring 16a. The dielectric layer 16c is a High-K (a multilayer film of alumina and hafnia), which is a high dielectric material, for example. The second capacitive wiring 16b is silicon nitride, for example. In this manner, the capacitive element 16 is formed.

Figure 8:
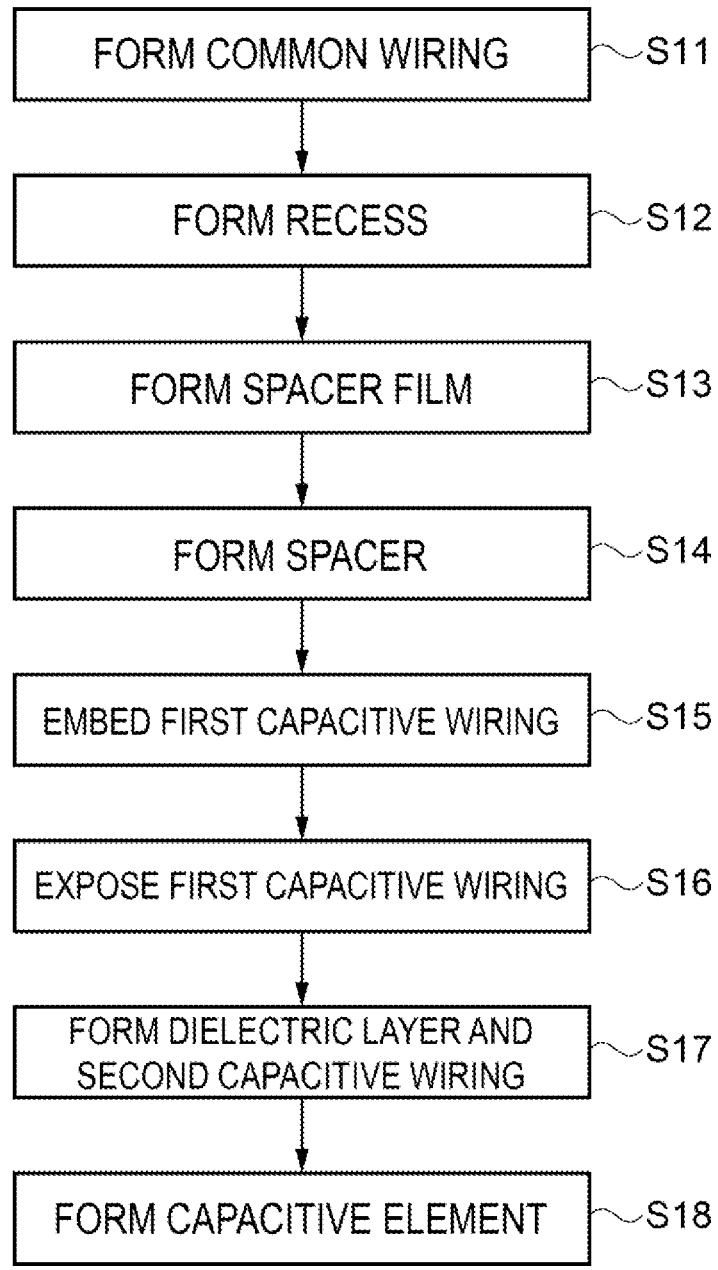
FIG. 8 is a flowchart of a manufacturing method of the capacitive element.
Figure 9:
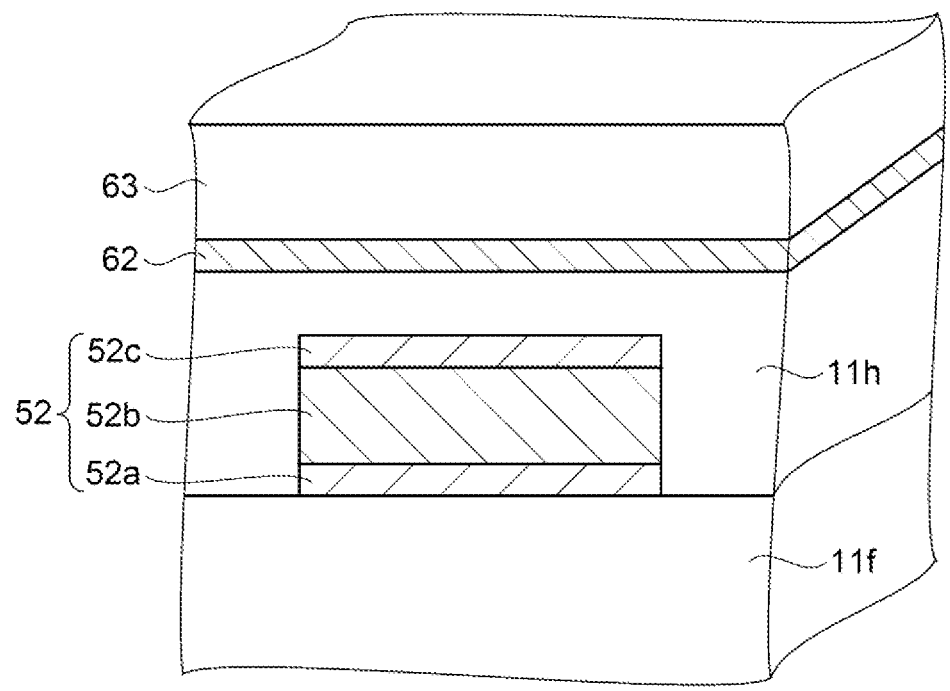
FIG. 9 is a perspective view illustrating a cross section corresponding to a process of the manufacturing method of the capacitive element.

Next, a manufacturing method of the capacitive element 16 is described with reference to a flowchart of FIG. 8 and explanatory diagrams of FIG. 9 to FIG. 15. FIG. 9 to FIG. 15 are perspective views illustrating cross-sectional structures at corresponding steps of FIG. 8 at a position along the B-B' line of the capacitive element illustrated in FIG. 6. First, as illustrated in FIG. 8, at step S11, the common wiring 52 is formed. To be more specific, as illustrated in FIG. 9, the common wiring 52 is formed on the insulation layer 11f formed on the first base material 10a (see FIG. 5). As described above, the common wiring 52 is a laminated film (52a, 52b, and 52c). Next, the insulation layer 11h, the stopper layer 62, and a sacrificial layer 63 are sequentially formed to cover the common wiring 52 and the insulation layer 11f. The sacrificial layer 63 is silicon oxide, for example.

Figure 10:
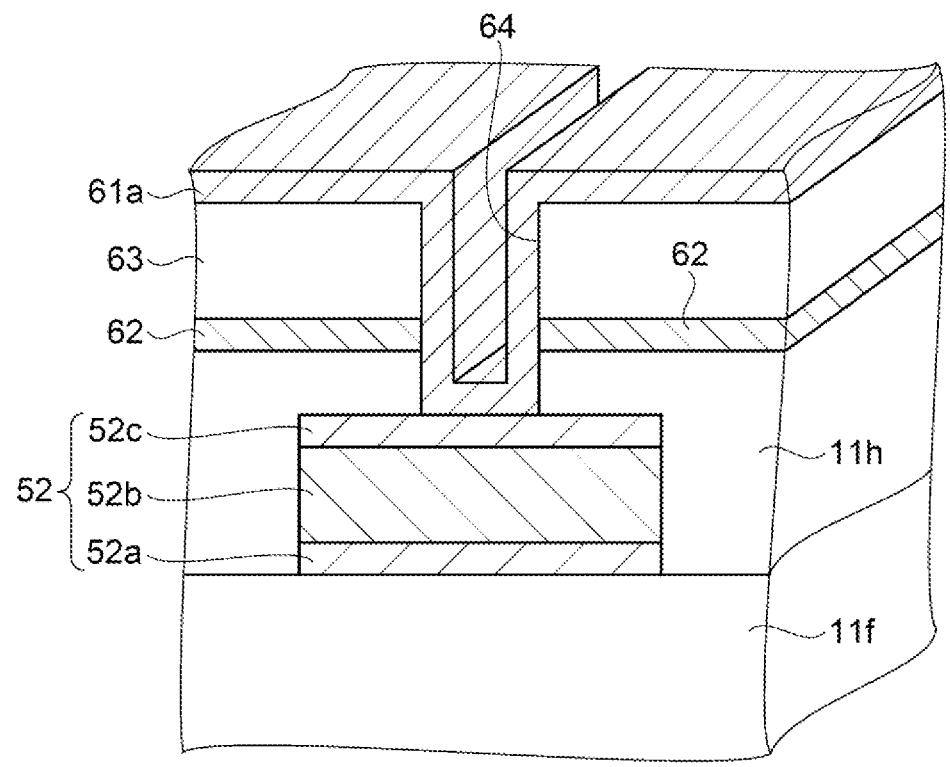
FIG. 10 is a perspective view illustrating a cross section corresponding to a process of the manufacturing method of the capacitive element.

At step S12, as illustrated in the plan view of FIG. 6, a recess 64 of a groove shape is formed in the sacrificial layer 63 in accordance with the shape of the first capacitive wiring 16a. To be more specific, as illustrated in FIG. 10, the recess 64 is formed by providing an etching process at a position that overlaps the common wiring 52 in the insulation layer 11h, the stopper layer 62, and the sacrificial layer 63. The recess 64 is formed in a shape in which the depth (the length in the Z direction) is greater than the width (the length in the X direction or the Y direction) of the opening.

At step S13, as illustrated in FIG. 10, a spacer film 61a is formed in the recess 64 and on the sacrificial layer 63. The width of the opening of the recess 64 can be reduced, or in other words, the width of the groove can be reduced, by forming the spacer film 61a.

Figure 11:
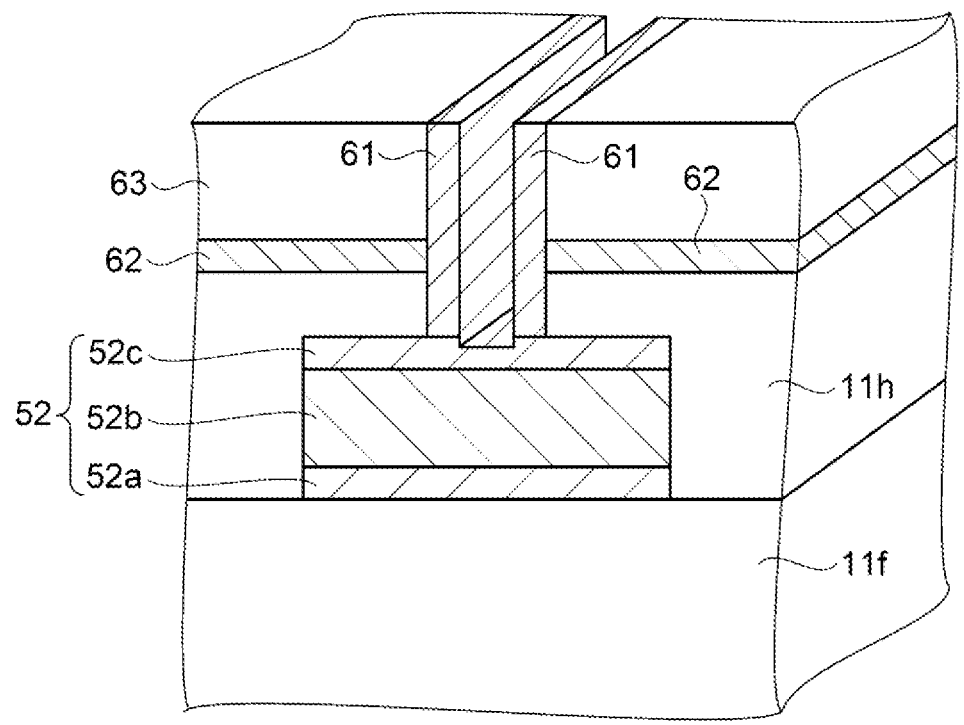
FIG. 11 is a perspective view illustrating a cross section corresponding to a process of the manufacturing method of the capacitive element.

At step S14, the spacer 61 is completed. To be more specific, as illustrated in FIG. 11, an anisotropic etching process is provided on the spacer film 61a. In this manner, the spacer film 61a on the sacrificial layer 63 and the spacer film 61a at the bottom of the recess 64 are removed, and the spacer 61 is formed only at the side wall of the recess 64.

Figure 12:
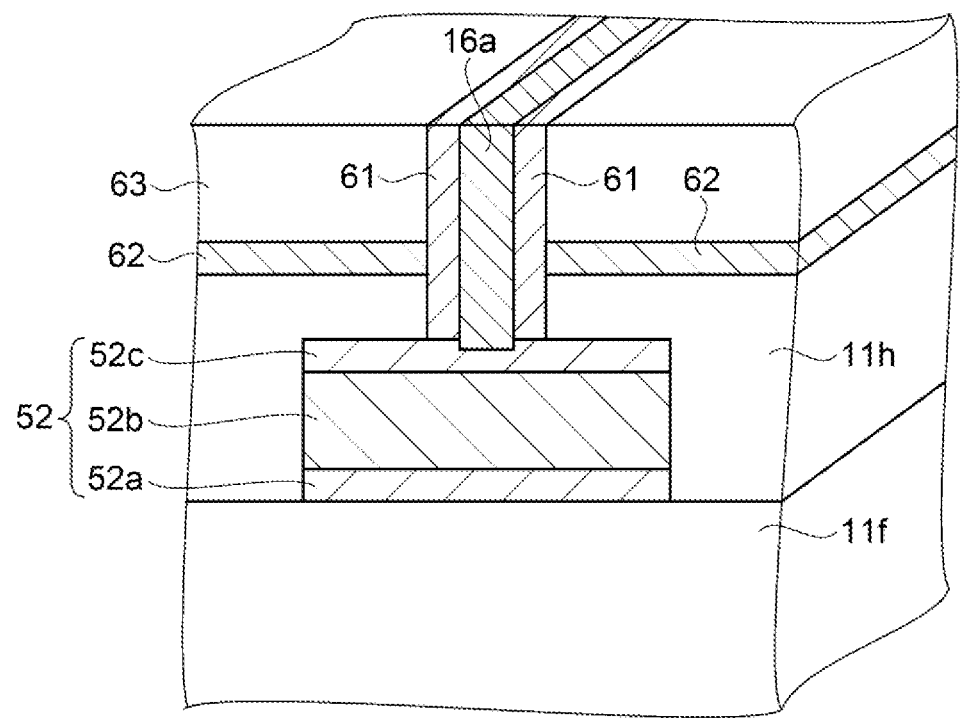
FIG. 12 is a perspective view illustrating a cross section corresponding to a process of the manufacturing method of the capacitive element.

At step S15, the first capacitive wiring 16a is embedded in the recess 64. To be more specific, as illustrated in FIG. 12, by embedding tungsten that is the material of the first capacitive wiring 16a in the recess 64, the first capacitive wiring 16a and the common wiring 52 exposed at the bottom of the recess 64 are coupled with each other and the common wiring 52 and the first capacitive wiring 16a are electrically coupled. Since the recess 64 is formed in a shape in which the depth (the length in the Z direction) is greater than the width of the opening (the shorter length of the length in the X direction or the length in the Y direction), the first capacitive wiring 16a composed of tungsten formed in the recess 64 is formed in a shape in which the length in the Z direction is greater than the width as with the shape of the recess 64, or in other words, in a plug shape. In the present disclosure, in terms of the shape, the plug shape refers to a shape in which the length in the height (or depth) direction along the Z direction is greater than the length in the width direction along the X direction or the Y direction. Preferably, the plug shape is a wall shape as illustrated in the drawing, but may be a columnar shape. Alternatively, in the present disclosure, in terms of the manufacturing process, the plug shape refers to a shape formed through the manufacturing process of the first capacitive wiring 16a illustrated in FIG. 8 to FIG. 15. It is to be noted that with the spacer 61 disposed in the recess 64, thinning of the first capacitive wiring 16a can be achieved.

Figure 13:
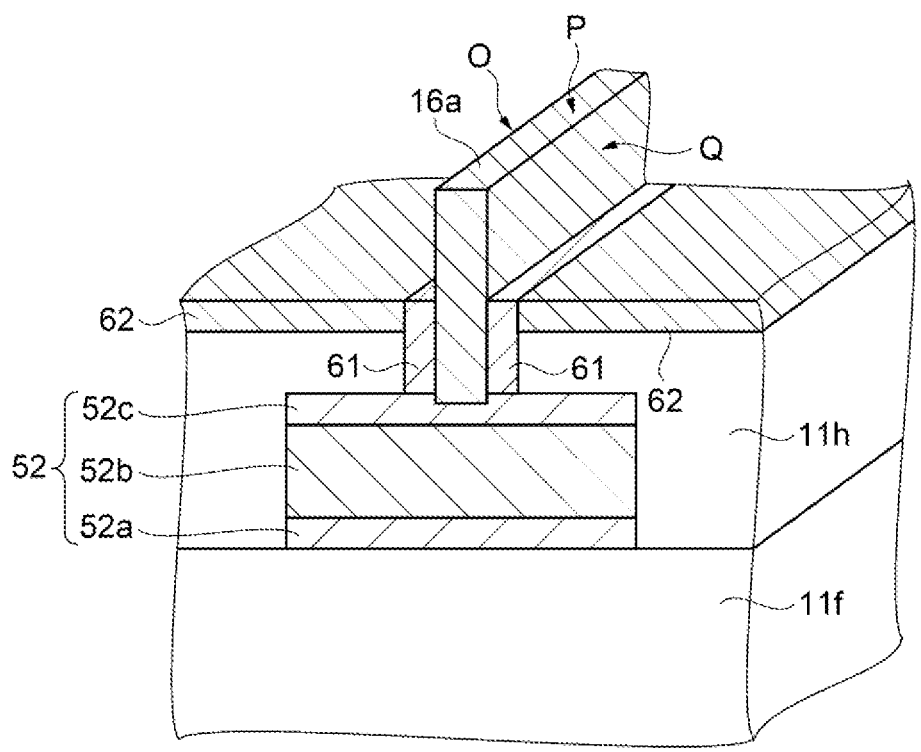
FIG. 13 is a perspective view illustrating a cross section corresponding to a process of the manufacturing method of the capacitive element.

At step S16, the upper part of the first capacitive wiring 16a is exposed. To be more specific, as illustrated in FIG. 13, by utilizing the selection ratio between the sacrificial layer 63 that is silicon oxide and the stopper layer 62 that is silicon nitride, the sacrificial layer 63 is removed up to the stopper layer 62 through an etching process. In this manner, about half of the upper part of the first capacitive wiring 16a is exposed in a wall shape. A surface O, a surface P and a surface Q represent exposed three consecutive surfaces of the first capacitive wiring 16a.

Figure 14:
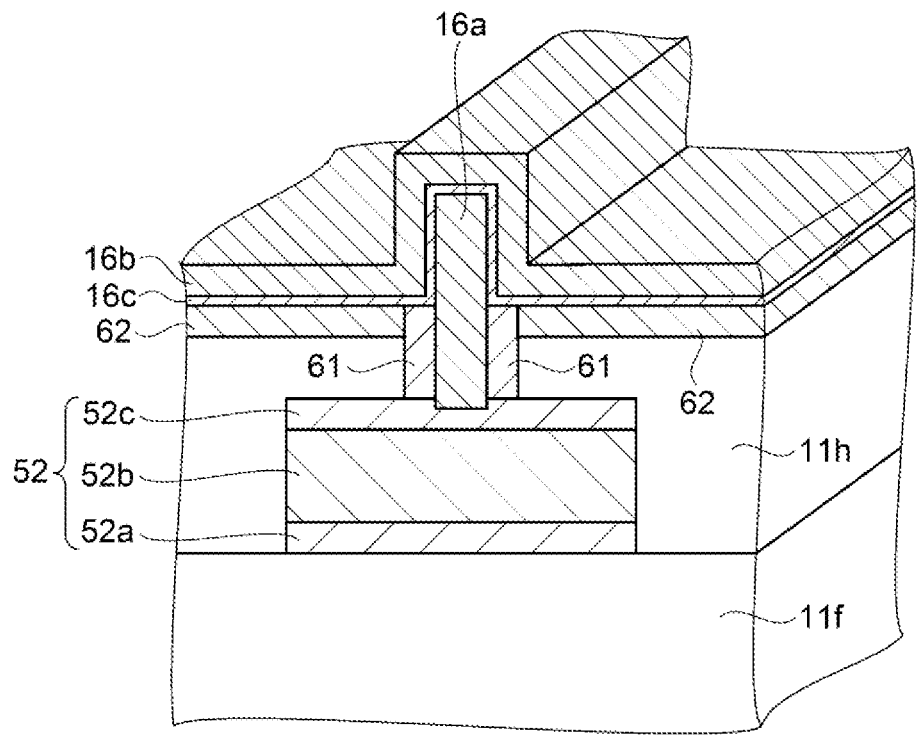
FIG. 14 is a perspective view illustrating a cross section corresponding to a process of the manufacturing method of the capacitive element.

At step S17, the dielectric layer 16c and the second capacitive wiring 16b are formed. To be more specific, as illustrated in FIG. 14, the dielectric layer 16c and the second capacitive wiring 16b are sequentially formed to cover the upper part of the first capacitive wiring 16a including the exposed surface O, surface P, and surface Q, the spacer 61, and the stopper layer 62.

Figure 15:
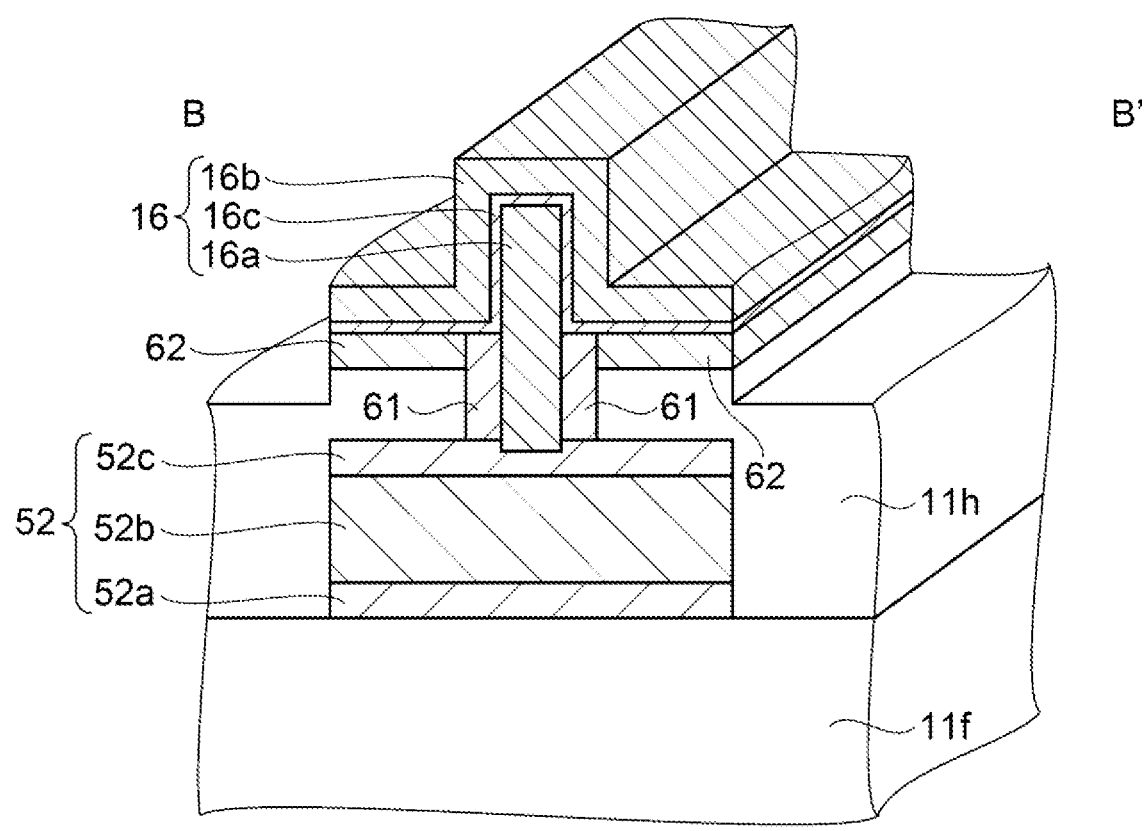
FIG. 15 is a perspective view illustrating a cross section corresponding to a process of the manufacturing method of the capacitive element.

At step S18, the capacitive element 16 is completed. To be more specific, as illustrated in FIG. 15, an etching process is performed until it extends through the second capacitive wiring 16b, the dielectric layer 16c, and the stopper layer 62 such that the width is substantially the same as the width of the common wiring 52. In the above-described manner, the capacitive element 16 including the first capacitive wiring 16a, the dielectric layer 16c, and the second capacitive wiring 16b is completed.

Figure 16:
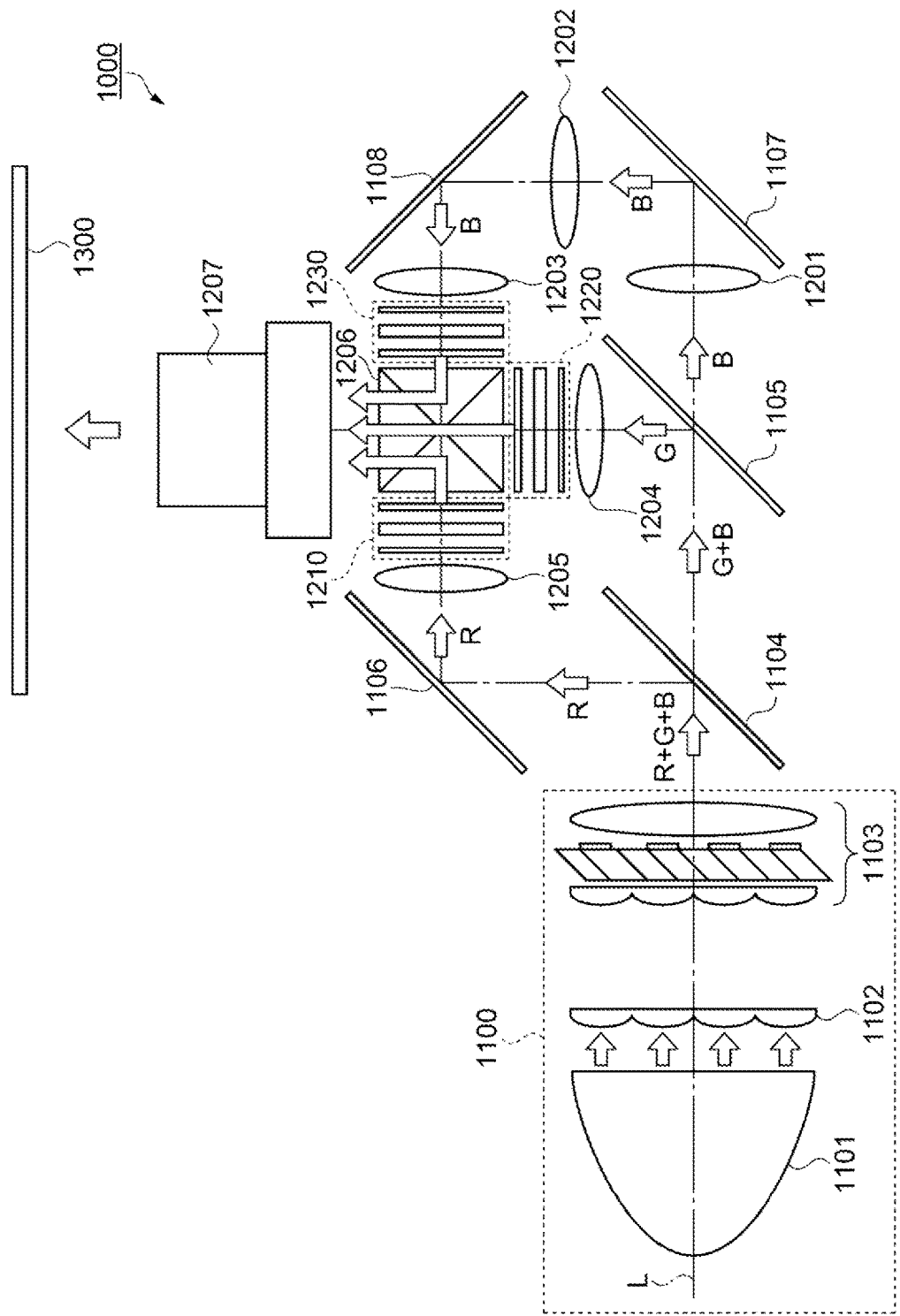
FIG. 16 is a schematic view illustrating a configuration of a projector serving as an electronic device.

As illustrated in FIG. 16, a projector 1000 serving as an electronic device of the present embodiment includes a polarized light illumination device 1100, two dichroic mirrors 1104 and 1105 serving as light separating devices, three reflection mirrors 1106, 1107, and 1108, five relay lenses

1201, 1202, 1203, 1204, and 1205, three transmission type liquid crystal light valves 1210, 1220, and 1230 serving as light modulate units, a cross-dichroic prism 1206 serving as a light synthesizing device, and a projection lens 1207.

The polarized light illumination device 1100 is roughly composed of a lamp unit 1101 serving as a light source composed of a white light source such as an ultra-high pressure mercury lamp and a halogen lamp, an integrator lens 1102, and a polarized light conversion device 1103.

Of a polarized light flux emitted from the polarized light illumination device 1100, the dichroic mirror 1104 reflects red light (R), and transmits green light (G) and blue light (B). The dichroic mirror 1105 reflects the green light (G) transmitted through the dichroic mirror 1104 and transmits the blue light (B) transmitted through the dichroic mirror 1104.

The red light (R) reflected by the dichroic mirror 1104 impinges on the liquid crystal light valve 1210 through the relay lens 1205 after being reflected by the reflection mirror 1106. The green light (G) reflected by the dichroic mirror 1105 impinges on the liquid crystal light valve 1220 through the relay lens 1204. The blue light (B) transmitted through the dichroic mirror 1105 impinges on the liquid crystal light valve 1230 through a light guiding system composed of the three relay lenses 1201, 1202, and 1203 and the two reflection mirrors 1107 and 1108.

The liquid crystal light valves 1210, 1220 and 1230 are disposed opposite to incidence surfaces of respective color lights of the cross-dichroic prism 1206. The color light incident on the liquid crystal light valves 1210, 1220 and 1230 is modulated based on the image information (video signal) and emitted toward the cross-dichroic prism 1206.

This prism is composed of four right-angle prisms bonded together, with dielectric multilayer films for reflecting red light and blue light formed in a crisscross pattern on its inner surface. The dielectric multilayer films synthesize the three colored lights to produce a synthesized light that represents a color image. The synthesized light is projected on a screen 1300 by the projection lens 1207 that is a projection optical system, and the image is displayed in a magnified manner.

The liquid crystal light valve 1210 applies the above-described liquid crystal device 100. It is to be noted that the liquid crystal light valve 1210 also applies a liquid crystal device 200 described later. The liquid crystal device 100 is disposed between a pair of polarization elements arranged in a cross-nicol manner on the incidence side and the light emission side, with a gap therebetween. The same applies to the liquid crystal light valves 1220 and 1230.

In addition to the projector 1000, the liquid crystal device 100 can be used in a variety of electronic devices, such as a head-up display (HUD), a head-mounted display (HMD), a smartphone, an electrical view finder (EVF), a mobile mini projector, an e-book, a cell phone, a mobile computer, a digital camera, a digital video camera, a display, an in-vehicle device, an audio device, an exposure device and a lighting device.

As described above, the liquid crystal device 100 of the present embodiment includes, on the first base material 10*a*, the pixel P, and the capacitive element 16 disposed in the light shielding region S between the pixel P and another pixel P adjacent to the pixel P, and the capacitive element 16 includes the first capacitive wiring 16*a* that extends along the light shielding region S, the dielectric layer 16*c* that covers at least consecutive three surfaces (the surface O, the surface P, and the surface Q) of the first capacitive wiring 16*a*, and the second capacitive wiring 16*b* that faces the three surfaces (the surface O, the surface P, and the surface Q) of the first capacitive wiring 16*a* through the dielectric layer 16*c*.

With this configuration, since the dielectric layer 16*c* is provided in such a manner as to cover the plug-shaped first capacitive wiring 16*a*, generation of coverage defects can be suppressed in comparison with the case where the dielectric layer 16*c* is provided in a trench, for example. Further, by thinning the plug-shaped first capacitive wiring 16*a*, the width of the light shielding region between the pixels P can be reduced, and thus narrow pitch, i.e., miniaturization can be achieved.

In addition, preferably, the common wiring 52 is provided between the first base material 10*a* and the capacitive element 16, and the common wiring 52 defines the opening region of the pixel P and is electrically coupled with the first capacitive wiring 16*a*.

With this configuration, since the width of the first capacitive wiring 16*a* has an influence on the width the common wiring 52, and the pixel pitch can be narrowed by forming the first capacitive wiring 16*a* in a thin shape, for example.

In addition, preferably, the stopper layer 62 is disposed between the common wiring 52 and the second capacitive wiring 16*b*.

With this configuration, since the stopper layer 62 is disposed, it can be used as an etching stopper when exposing a part of the plug-shaped first capacitive wiring 16*a*.

In addition, preferably, the spacer 61 is disposed between the stopper layer 62 and the first capacitive wiring 16*a*.

With this configuration, by forming the spacer 61 before forming the first capacitive wiring 16*a*, the width of the first capacitive wiring 16*a* can be reduced, i.e., thinning can be achieved, and thus, miniaturization can be achieved.

In addition, preferably, the first capacitive wiring 16*a* is tungsten.

With this configuration, the plug-shaped first capacitive wiring 16*a* can be achieved.

In addition, preferably, the insulation layer 11*h* is disposed between the common wiring 52 and the stopper layer 62.

With this configuration, since the insulation layer 11*h* is disposed, it is possible to prevent the second capacitive wiring 16*b* and the common wiring 52 from being electrically coupled.

In addition, since the above-mentioned liquid crystal device 100 is provided, it is possible to provide the projector 1000 that can improve the display quality.

The manufacturing method of the liquid crystal device 100 of the present embodiment includes a step of forming the common wiring 52 on the first base material 10*a*, a step of sequentially forming the insulation layer 11*h*, the stopper layer 62, and the sacrificial layer 63 on the first base material 10*a* and the common wiring 52, a step of forming the recess 64 in the sacrificial layer 63, the stopper layer 62, and the insulation layer 11*h* in such a manner as to reach the common wiring 52, a step of forming the spacer 61 at a side wall of the recess 64, a step of forming the plug-shaped first capacitive wiring 16*a* in the recess 64 including the spacer 61, a step of exposing a part of the first capacitive wiring 16*a* by removing a part of the spacer 61 and the sacrificial layer 63 by using the stopper layer 62, a step of sequentially forming the dielectric layer 16*c* and the second capacitive wiring 16*b* in such a manner as to cover at least consecutive three surfaces of first capacitive wiring 16*a* that are exposed, and a step of forming the capacitive element 16 by removing the second capacitive wiring 16*b*, the dielectric layer 16*c* and the stopper layer 62 so that the capacitive element has the same width as the width of the common wiring 52.

Through this method, since the dielectric layer 16c and the second capacitive wiring 16b are formed after exposing a part of the plug-shaped first capacitive wiring 16a, the generation of coverage defects can be suppressed in comparison with the case where the dielectric layer 16c is formed in a trench, for example. Further, by thinning the plug-shaped first capacitive wiring 16a, the width of the light shielding region between the pixels P can be reduced, and thus narrow pitch, i.e., miniaturization can be achieved.

Figure 17:
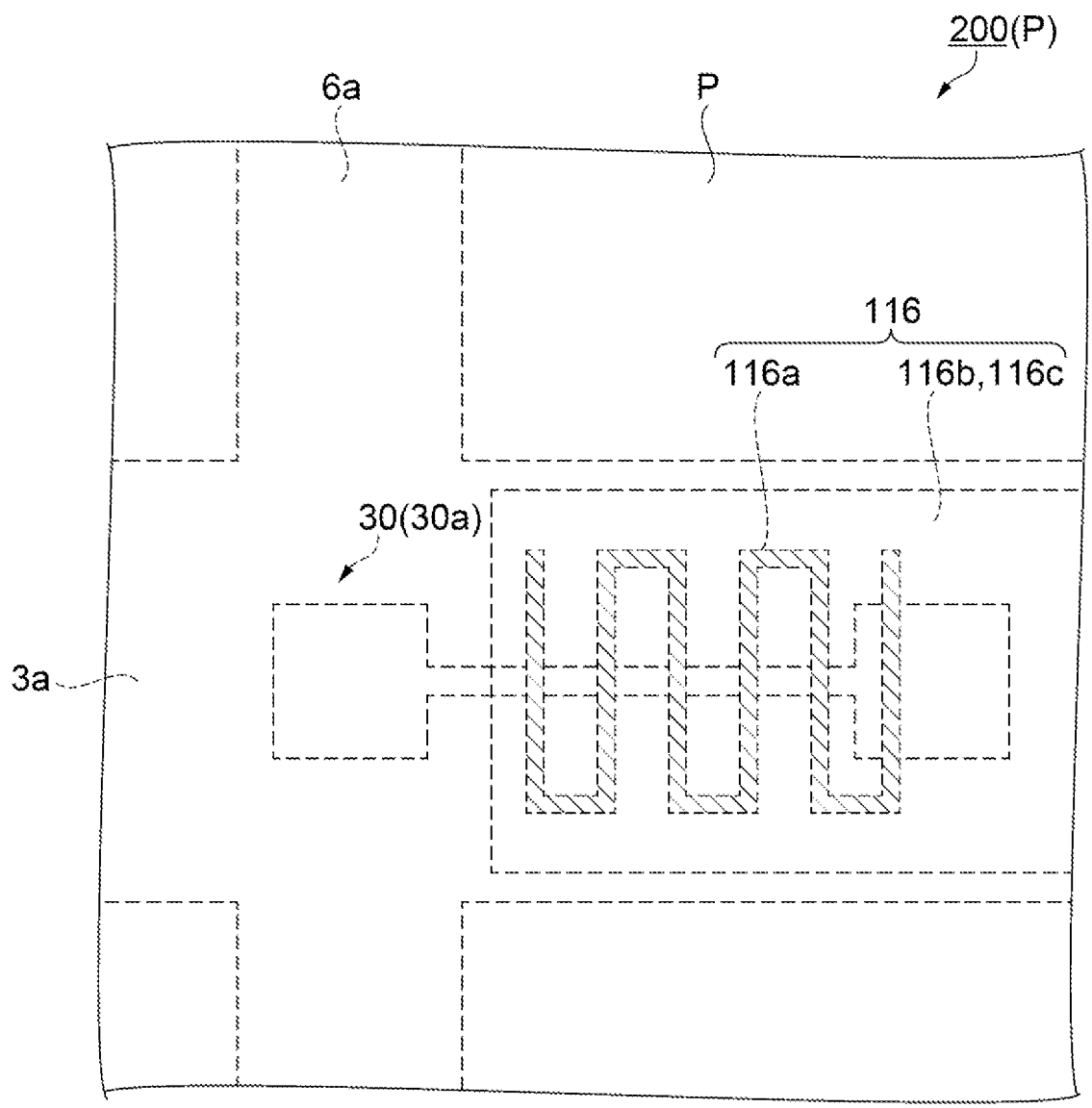
FIG. 17 is a plan view illustrating a configuration of a pixel of a modification.

It is to be noted that the above-described structure of the liquid crystal device 100 is not limitative, and the structure of the liquid crystal device 200 may be applied, for example. FIG. 17 is a plan view illustrating a structure of the pixel P, in particular the transistor 30 and a capacitive element 116, of the liquid crystal device 200 of a modification.

As illustrated in FIG. 17, in the liquid crystal device 200, the semiconductor layer 30a is disposed along the extending direction of the scan line 3a. The capacitive element 116 is disposed at a position where it overlaps the scan line 3a, for example. While the capacitive element 116 is different from the capacitive element 16 of the above-mentioned embodiment in shape, the capacitive element 116 includes a first capacitive wiring 116a, a dielectric layer 116c, and a second capacitive wiring 116b.

With this configuration, even in the case where the semiconductor layer 30a is disposed along the data line 6a or the scan line 3a, and even in the case where the capacitive element 116 is arranged in a different location or shape, the width of the light shielding region between the pixels P can be reduced, and thus narrow pitch, i.e., miniaturization can be achieved as in the above-mentioned embodiment.

In addition, the above-mentioned shapes of the first capacitive wirings 16a and 116a are not limitative, and shapes that can gain the capacity area are preferable.

What is claimed is:

1. An electric optical device comprising, at a substrate, a pixel, a capacitive element disposed in a light shielding region between the pixel and another pixel adjacent to the pixel, a stopper layer disposed between the capacitive element and the substrate, and a first wiring between the substrate and the capacitive element,
wherein the capacitive element includes:
a first capacitive electrode disposed along the light shielding region;
a capacitive insulation layer configured to cover at least consecutive three surfaces of the first capacitive electrode; and
a second capacitive electrode configured to face the three surfaces of the first capacitive electrode through the capacitive insulation layer,
the first wiring defines an opening region of the pixel, and is coupled with the first capacitive electrode,
the stopper layer is disposed between the first wiring and the second capacitive electrode, and
a spacer is disposed between the stopper layer and the first capacitive electrode.

2. The electric optical device according to claim 1, wherein the first capacitive electrode is tungsten.

3. The electric optical device according to claim 1, wherein an interlayer insulation layer is disposed between the first wiring and the stopper layer.

4. An electronic device comprising the electric optical device according to claim 1.

5. A manufacturing method of an electric optical device comprising:
forming a first wiring at a substrate;
sequentially forming an interlayer insulation layer, a stopper layer and a sacrificial layer at the substrate and the first wiring;
forming a recess in the sacrificial layer, the stopper layer, and the interlayer insulation layer such that the recess reaches the first wiring;
forming a spacer at a side wall of the recess,
forming a first capacitive electrode having a plug shape in the recess including the spacer;
exposing a part of the first capacitive electrode by removing a part of the spacer and the sacrificial layer by using the stopper layer;
sequentially forming a capacitive insulation layer and a second capacitive electrode in such a manner as to cover at least consecutive three surfaces of the first capacitive electrode that are exposed; and
forming a capacitive element by removing the second capacitive electrode, the capacitive insulation layer, and the stopper layer so that the capacitive element has substantially the same width as a width of the first wiring.

6. An electro-optical device comprising:
a first wiring;
an interlayer insulation layer including an opening;
a capacitive element including:
a first capacitive electrode having a first portion and a second portion, the first portion being buried in the opening and electrically connected to the wiring, the second portion protruding from the interlayer insulation layer,
a capacitive insulation layer configured to cover the second portion of the first capacitive electrode, and
a second capacitive electrode configured to cover the second portion of the first capacitive electrode through the capacitive insulation layer; and
the first wiring between a substrate and the capacitive element, wherein
the first wiring defines an opening region of a pixel, and is coupled with the first capacitive electrode,
a stopper layer is disposed between the first wiring and the second capacitive electrode, and
a spacer is disposed between the stopper layer and the first capacitive electrode.

7. The electro-optical device according to claim 6, wherein
the first capacitive electrode includes a material that is different from that of the first wiring.

8. The electro-optical device according to claim 6, wherein
the opening of the interlayer insulation layer has a groove shape.

9. The electric optical device according to claim 6, wherein
the stopper layer is disposed between the interlayer insulation layer and the capacitive insulation layer.

* * * * *